US011774926B2

United States Patent
Roos

(10) Patent No.: US 11,774,926 B2
(45) Date of Patent: Oct. 3, 2023

(54) SENSOR SYSTEM AND METHOD FOR MEASURING A PROCESS VALUE OF A PHYSICAL SYSTEM

(71) Applicants: NM Numerical Modelling GmbH, Zug (CH); Maglab AG, Basel (CH)

(72) Inventor: Markus Roos, Zug (CH)

(73) Assignees: Maglab AG, Basel (CH); NM Numerical Modelling GmbH, Zug (CH)

( * ) Notice: Subject to any disclaimer, the term of this patent is extended or adjusted under 35 U.S.C. 154(b) by 102 days.

(21) Appl. No.: 17/478,564

(22) Filed: Sep. 17, 2021

(65) Prior Publication Data
US 2022/0171352 A1 Jun. 2, 2022

(30) Foreign Application Priority Data
Dec. 2, 2020 (EP) .................................. 20211276

(51) Int. Cl.
G05B 13/04 (2006.01)
G05B 23/02 (2006.01)

(52) U.S. Cl.
CPC ......... G05B 13/048 (2013.01); G05B 13/042 (2013.01); G05B 23/0221 (2013.01); G05B 23/0254 (2013.01)

(58) Field of Classification Search
None
See application file for complete search history.

(56) References Cited

U.S. PATENT DOCUMENTS

| 6,285,971 | B1 | 9/2001 | Shah et al. |
| 6,662,140 | B2 | 12/2003 | Martis |
| 2003/0128026 | A1* | 7/2003 | Lutz .................. G01D 5/145 324/207.2 |
| 2005/0267608 | A1* | 12/2005 | Nishira .............. B60K 31/0008 700/44 |
| 2006/0284588 | A1 | 12/2006 | Vau |
| 2009/0326859 | A1* | 12/2009 | Hammerschmidt ........ G01D 5/2448 702/151 |

(Continued)

OTHER PUBLICATIONS

Winder, "Shaft angle encoders", Oct. 1959, Electronic Industries, pp. 76-77 (Year: 1959).*

(Continued)

*Primary Examiner* — Mohammad Ali
*Assistant Examiner* — David Earl Ogg
(74) *Attorney, Agent, or Firm* — M&B IP Analysts, LLC

(57) ABSTRACT

The present disclosure describes a sensor system for measuring a process value of a physical system, including: a plurality of sensors, wherein each sensor is configured to generate a sense signal as a function of the process value at a given time; a system state corrector configured to determine an actual system state of the physical system at a given state update cycle; a system state predictor configured to determine a predicted system state of the physical system at a given prediction cycle from a previous system state at a previous state update cycle; a sense signal predictor configured to determine predicted sense signals at the given prediction cycle from the predicted system state by applying a first operation to the predicted system state using a sense signal model of the physical system for predicting the sense signals.

17 Claims, 9 Drawing Sheets

(56) References Cited

U.S. PATENT DOCUMENTS

| | | | | |
|---|---|---|---|---|
| 2012/0059642 | A1 | 3/2012 | Vollmer et al. | |
| 2012/0283849 | A1* | 11/2012 | Kureemun | G05B 17/02 |
| | | | | 700/30 |
| 2013/0185017 | A1* | 7/2013 | Francescon | G01B 7/003 |
| | | | | 702/150 |
| 2013/0245929 | A1* | 9/2013 | Withopf | G01S 7/4021 |
| | | | | 701/300 |
| 2014/0249654 | A1* | 9/2014 | Blevins | G05B 13/048 |
| | | | | 700/21 |
| 2019/0226880 | A1* | 7/2019 | Raman | G01D 18/008 |
| 2019/0353502 | A1* | 11/2019 | Doshi | G01D 3/10 |
| 2020/0249126 | A1* | 8/2020 | Ceschini | H04Q 9/00 |
| 2021/0311441 | A1* | 10/2021 | Toku | G05B 13/0265 |

OTHER PUBLICATIONS

RLS, "Linear magnetic encoders", 2009, Internet Archive Wayback Machine https://web.archive.org/web/20091010050910/http://www.rls.si/default.asp?prod=LMencoders , pp. 1 (Year: 2009).*

TI, "Principles of Data Acquisition and Conversion", Tl Application Report SBAA051A, Apr. 2015, pp. 4 (Year: 2015).*

European Patent Office. Extended European Search Report for Application 20211276.9-1010, dated Mar. 5, 2021.

* cited by examiner

SENSOR SYSTEM AND METHOD FOR MEASURING A PROCESS VALUE OF A PHYSICAL SYSTEM

TECHNICAL FIELD

The present disclosure generally relates to a sensor system for measuring a process value of a physical system, such as a position of a position indicator of a kinematic system, particularly a highly dynamic system. The present disclosure also relates to a method for measuring a process value of a physical system, such as a position of a position indicator of a dynamic kinematic system, particularly a highly dynamic system.

BACKGROUND

Sensor systems for measuring a position (process value) of a rotating or linearly moving position indicator (physical system) are generally known, in which the position information to be obtained is represented by sine and cosine shaped varying raw sensor signals. Possible implementations include e.g. the measurement of magnetic field components of a magnetic induction field of a permanent magnet at suitable locations in space. The searched position information may be obtained by applying the arctangent to the measured sine and cosine shaped sensor signal values. These prerequisites severely restrict possible arrangements of sensor elements and position indicator, and in particular require a high degree of accuracy in their production or the relative positioning of the sensor chip and the position indicator, respectively.

A fundamental difficulty with these methods is that a non-ideal arrangement of the position indicator and the sensor chip leads to distortions of the raw signals, namely that these no longer have the pure sine and cosine shape and thus lead to an inaccurate determination of the position.

Furthermore, in many instances, a position sensing system is responsive to external fields (e.g. the earth's magnetic field in the case of a position indicator based on permanent magnets). Without countermeasures, these additional field components cannot be distinguished from the useful field so that the external fields restrict the accuracy of the position measuring system.

A fundamental challenge for position measuring systems is their long-term stability, i.e. an initially sufficiently accurate calibration of the dynamic system changes over time, e.g. by mechanical displacement of the components relative to one another or by drifting of electronic sensor properties. A fault-tolerant system and method for ascertaining the measurement quality of such dynamic physical systems during normal operation are described in U.S. Pat. No. 10,557,722 B2, which is incorporated herein in its entirety by reference, thus improving the long-term stability of such measuring systems. The proposed solution for determining the position of a position indicator was based on the finding that the sensor measurement values supplied by the sensors can be represented as a measurement vector, i.e. as a point in a vector space, the dimension of which corresponds to the number of sensors, and that the measurement vectors generated during the movement of the position indicator (rotation about an axis of rotation or displacement along an axis) lie on a path or orbit in this vector space. This orbit can—under ideal conditions—be projected onto a circle or a circular arc by means of a linear mapping, i.e. each position of the position indicator corresponds to a point on the orbit in the abstract space of the signal vectors which is unambiguously assigned to a point on the circle or arc. Non-ideal conditions, for example non-ideal properties of the position indicator, which can be particularly the case with magnets, or an insufficient number of sensors or the use of non-optimally selected calibration positions, cause deviations from the circular shape. The linear mapping can be represented as a matrix-vector operation and can be determined using standard methods of linear algebra. Each measurement vector is projected onto a 2-component pointer vector, the tip of which approximates a circular arc, wherein the direction of the 2-component vector corresponds to the position of the position indicator.

However, the aforementioned sensor system and method for measuring the position of the position indicator require concurrent instantaneous measurement of all sensor signals to be subjected to the matrix-vector multiplication to obtain the pointer vector at this instant. The electronic implementation is challenging and inevitably leads to high processor clock rates for large bandwidths. Furthermore, the use of parallel analog-to-digital converters (ADC) for concurrent uniform sampling of the individual sensor signals is cumbersome with respect to stability issues. The actual signal processing consists of the matrix-vector multiplication as mentioned above.

Accordingly, there is a need for a sensor system and method for measuring a process value of a physical system being distinguished by an improved performance, where performance is assessed inter alia on the qualities of operational robustness, numerical precision, long-term stability, application flexibility, and production/implementation ease and cost.

SUMMARY

It is an object of the present disclosure to provide a sensor system and method for measuring a process value of a (highly) dynamic physical system which each ensure high operational robustness and long-term stability, for example low susceptibility to interference due to noise, temperature, and external fields (e.g. the earth's magnetic field in the case of measurements based on magnetic fields), and accurate measurement results in a highly dynamic environment. Furthermore, the flexibility of the system and method with respect to various use cases and requirements, low manufacturing/implementation complexity and cost, for example through the use of well-known mathematical modelling concepts, standard signal processing hardware etc., shall also be improved.

The present disclosure is defined by the independent claims. The dependent claims define advantageous embodiments.

It is to be noted that the individual features listed in the description below can be combined in any technically meaningful way with each other (also across different categories, e.g. apparatus and method) and show further embodiments of the present disclosure. The description of the various embodiments are additionally characterized and specified particularly in connection with the figures.

Furthermore, it is to be understood that the term "and/or" or the expressions "at least one of" or "one or more of", if used herein in order to combine a first and a second feature, are to be construed as disclosing a first embodiment of the disclosed embodiments that comprises only the first feature, a second embodiment of the disclosed embodiments that comprises only the second feature, and a third embodiment of the disclosed embodiments that comprises both the first feature and the second feature. If more than two features listed, also any combinations thereof are to be construed as disclosed embodiments according to the disclosed embodiments.

Still further, the term "approximately" or "essentially" indicates a range of tolerance which the skilled person in the field in question considers to be normal. In particular, the term "approximately" or "essentially" is to be understood as a tolerance range of the referred quantity of up to a maximum of +/−20%, preferably up to a maximum of +/−10%.

According to an aspect, a sensor system for measuring a process value (e.g. position, velocity, acceleration of a position indicator) of a physical system (in particular a dynamic system comprising moving/rotating components including the position indicator for example) comprises: a plurality of sensors (e.g. Hall sensors in the case of measuring a magnetic field indicating a characteristic of the physical system to be monitored), wherein each sensor is configured to generate a sense signal (particularly e.g. a continuous-time sense signal) as a function of the process value at a given time; a system state corrector configured to determine an actual system state of the physical system at a given state update cycle, wherein the system state comprises the process value at the given state update cycle and at least a first order derivative of the process value (i.e. in case the process value represents a position information, the first order derivative thereof represents a velocity) at the given state update cycle; a system state predictor configured to determine a predicted system state of the physical system at a given prediction cycle from a previous system state at a previous state update cycle; a sense signal predictor configured to determine predicted sense signals at the given prediction cycle from the predicted system state by applying a first operation to the predicted system state using a sense signal model (e.g. a signal model matrix) of the physical system for predicting the sense signals; wherein the system state corrector is further configured to determine the actual system state at the given state update cycle by applying a second operation (e.g. a Kalman filter operation) to the predicted system state according to an error signal, the error signal being representative of the difference between a set of acquired sense signals acquired from the sense signals each at the given prediction cycle and the corresponding predicted sense signals for each of the acquired sense signals.

In other words, the process value information (e.g. position information of a position indicator) encoded in the sense signals is used to control a digital representation of the physical system (e.g. a rotating physical system such as a motor/generator shaft and the like) in a phase-locked loop (PLL). The system state, i.e. the state of the digital representation of the physical system, is updated in a two-stage-process: (i) The previous system state at the previous state update cycle is used to predict the system state at the given prediction cycle, and (ii) using the set of actually acquired (measured) sense signals, the predicted system state is then corrected accordingly to obtain the system state at the actual state update cycle. This process may be successfully and effectively applied to the case of sensor arrangements providing redundant measurements or sense signals which are distorted by offsets and/or amplitude mismatches due to non-idealities.

For the prediction of the sense signals which are used in conjunction with the corresponding actually acquired sense signals to form the error signal, the sense signal model modelling the measurement process of the physical system is used to be applied to the predicted system state in the first operation. The sense signal model may be represented as a model matrix containing information about the measurement process of the sensors in the dynamic physical system. This information may be acquired (once) in a separate calibration process. From this calibration process, the sense signal model and characteristics of possibly present higher harmonics may be identified. This facilitates an accurate and fast prediction of the sense signals form the predicted system state. In the second operation, which, without being limited thereto, may be a Kalman filter operation adopted to eventually evaluate the corrected system state from the error signal, i.e. the difference between the set of the predicted sense signals and the corresponding acquired sense signals each at the given prediction cycle.

According to the present disclosure, it is therefore possible to apply this concept to the case of sensors with redundant (more than two) measurements or if the primary sense signals are distorted by offsets and/or amplitude mismatches (i.e. not ideal measurement conditions).

It is to be understood that the set of the acquired and predicted sense signals may vary in number between different state update cycles, for example the signal set may include only one single acquired sense signal along with its corresponding predicted sense signal at the same prediction cycle, or it may include more than only one acquired sense signal along with their corresponding predicted sense signals at different prediction cycles one by one. However, each pair of corresponding signals, i.e. one of the acquired sense signals along with its corresponding predicted sense signal, is always related to the same prediction cycle, i.e. the same time instant. Despite the possibly varying number of signal pairs (predicted and acquired signals) available at each state update cycle, the second operation will accurately update the system state at each state update cycle from the previous system state at the previous state update cycle.

It is to be noted that the system state corrector, the system state predictor, and the sense signal predictor may be implemented using a digital processing unit. The digital processing unit may be any circuit configuration capable of receiving and outputting a signal. Therefore, the digital processing unit may be any hardware and/or software configuration capable of operating on the received signal(s), performing an operation on the received signal(s), thereby determining the actual system state, and outputting the determined system state. For example, the digital processing unit may be a digital signal processor (DPS), microprocessor (µP), microcontroller (µC) and the like, however, without being limited thereto.

As set forth above, the sensor system according to the present disclosure facilitates the measurement of the process value of a (highly) dynamic physical system with high accuracy and low susceptibility to non-idealities such as interference due to noise, temperature, and external fields, resulting in a significantly improved operational robustness and long-term-stability of the sensor system.

As stated above, the set of the acquired sense signals may comprise one single sense signal from one of the sensors, a plurality of sense signals from more than one but less than all of the sensors, or a plurality of sense signals from all of the sensors.

According to advantageous embodiments of the present disclosure, the set of the acquired sense signals comprises one sense signal from one of the sensors, or a plurality of sense signals from more than one but less than all of the sensors such that the set of the acquired sense signals contains only a partial information of the system state, wherein the partial information is not sufficient to deterministically identify the system state at the state update cycle. However, as set forth herein, the second operation being applied to the predicted system state using the error signal still provides for the update of the system state at the state update cycle.

A situation, in which the information (herein also referred to as partial information) conveyed by the set of the acquired sense signals during a state update cycle does not allow a deterministic identification of the actual system state, may arise when the set of the acquired sense signals only comprises one single acquired sense signal per one state update cycle, or, for example, in the case of a rotating position indicator whose angular position (process value) is to be measured by the sensor system, wherein all the acquired sense signals represent the same type of position information, for example only sine or only cosine related signal information about the angular position of the position indicator, i.e. a phase difference or shift between the considered acquired sense signals which may be essentially 180°. In such a case, provided a state-of-the-art solution, the searched process value, i.e. in the example above the angular position information of the rotating position indicator, is no longer obtainable unambiguously by applying an inverse function to the set of the acquired sense signals, e.g. the arctangent. However, according to the present disclosure, such partial information may be used to determine an unambiguous position of the position indicator (i.e. a deterministic identification of the actual system state) using all the available information of the sense signals and the predicted state.

According to further advantageous embodiments of the present disclosure, the set of the acquired sense signals comprises sense signals from more than one or all of the sensors, wherein each of the acquired sense signals corresponds to the same given time instant, i.e. the same given prediction cycle (herein also referred to as uniform sampling). Stated otherwise, all the acquired sense signals constituting the set of the acquired sense signals at the current state update cycle and consequently all the corresponding predicted sense signals relate to the same time instant and to the same prediction cycle, respectively. To this end, all the acquired sense signals are acquired from the sense signals (i.e. sense signals provided by the sensors) simultaneously, e.g. using a multi-channel analog-to-digital converter (ADC) providing one channel to each of those sense signals to be acquired at the same time instant. In the case that the set of the acquired sense signals comprises the sense signals of all of the provided sensors, it may be advantageous to only have one single prediction cycle for each state update cycle as all sensor information is gathered simultaneously in one single acquisition step. However, depending on the desired system state update frequency, the simultaneous acquisition of the plurality of sense signals may become demanding, particularly if all the sense signals of all provided sensors are to be acquired simultaneously, as a clock rate of a digital processing unit becomes likewise high. Furthermore, the first operation using the sense signal model (e.g. matrix) for calculating all corresponding predicted sense signals must be performed on the entire model matrix if the entire sense signal information of all provided sensors is to be included. On the other hand, more actually acquired sense signal information during one state update cycle may improve the accuracy of the updated system state information significantly.

In the case of only one single acquired sense signal constituting the set of the acquired sense signals per prediction cycle and per state update cycle possible according to the embodiments described before the preceding uniform sampling embodiments, the state update cycle may update the system state at an r-times faster rate r/T instead of 1/T, while during the time period T the same overall information is processed, with r being the number of sensors provided and T being the system state update period. This provides better accuracy and less latency compared to the uniform sampling case above.

According to yet other advantageous embodiments of the present disclosure, the set of the acquired sense signals comprises sense signals from more than one or all of the sensors, wherein at least two of the acquired sense signals correspond to different given time instants, i.e. different given prediction cycles within the same state update cycle (herein also referred to as non-uniform sampling). It is to be noted that, as also stated above, although the set of the acquired sense signals may comprise acquired sense signals having been acquired at different time instants and different prediction cycles, respectively, each predicted sense signal and its associated corresponding acquired sense signal always relate to the same time instant, i.e. the same prediction cycle. According to the present embodiments, subsequent acquisition of the sense signals is facilitated in turn allowing the use of ADCs having fewer or even only one single analog-to-digital channel leading to less thermal drift issues. The various sense signals may be acquired in a time-multiplexing fashion during the same state update cycle. Furthermore, it may be possible to gather more than only two acquired sense signals of different time instants and different prediction cycles, respectively, within the same state update cycle before eventually updating the system state, thus improving the information content the second operation may use for a more accurate system state update determination.

In any of the cases according to the present disclosure where the set of the acquired sense signals used in the same state update cycle comprises sense signals of less than all of the provided sensors, the first and second operations may reduce significantly in terms of computational time as a reduced set of the acquired sense signals along with their corresponding predicted sense signals facilitates the omission of re-computing those mathematical terms which include only sense signal information that has not been actually acquired and respectively predicted within the current state update cycle (thus not providing any new information with respect to the previous state update cycle).

For example, if the sense signal model used for predicting the sense signals at the given prediction cycle is represented as a model matrix having row and column entries, wherein each row may relate to the sense signal of one sensor and each row entry (i.e. the column entries of the model matrix) may refer to multiple harmonic components assessed during the calibration process, only the rows of the model matrix corresponding to the sense signals that are actually to be predicted according to the associated and newly acquired sense signals may be included in the mathematical operations to be conducted, whereas the remaining matrix information may be simply omitted thus reducing the overall computational effort significantly for the current state update cycle. Nonetheless, the prediction of each predicted sense signal depends on the entire information provided by the previous system state. Particularly, this information may comprise all the harmonic components assessed during the calibration process and contained in the model matrix for the specific sense signal to be predicted.

Likewise, the second operation (e.g. a Kalman filter operation) using the error signal, i.e. the differences between each of the acquired sense signals and the corresponding predicted sense signals, reduces to the mathematical operations using the actually acquired and predicted sense signals in the current state update cycle only.

Summing up, the signal processing speed may be increased by non-uniform sense signal acquisition and the single sense signal acquisition per prediction cycle and per state update cycle, as the corresponding first and second operations (possibly including a Kalman filter prediction and update) is inherently computationally simpler as the matrices involved are considerably smaller.

Preferably, the reduction of the computational effort is put into effect automatically within each state update cycle according to further embodiments of the present disclosure.

In this regard, according to further advantageous embodiments of the present disclosure, the sense signal predictor is configured to determine only the predicted sense signals corresponding to the set of acquired sense signals at the given prediction cycle.

Still according to other advantageous embodiments of the present disclosure, the set of the acquired sense signals comprises selected sense signals from more than one but less than all of the sensors, wherein, among all of the sense signals, at the prediction cycle the selected sense signals of the set of the acquired sense signals contain a more accurate information of the system state or have at least first order derivatives with a larger absolute value than the non-selected sense signals. For example, the selected sense signals may be sense signals of two different sensors providing sense signals ideally having a phase difference or phase shift of approximately 90°. Additionally or alternatively, the selected sense signals may be sense signals of those sensors providing sense signals at the current prediction cycle having a high rate of change (or the highest of all rates of change), i.e. a larger absolute value (or the largest of all absolute values) of their respective first order derivatives. Even higher than first order derivatives may be considered as well. In either case, the system state information contained in the set of the acquired sense signals per state update cycle is optimally improving the overall accuracy of the sensor system.

According to yet further advantageous embodiments of the present disclosure, the first and second operations constitute an extended Kalman filter or a non-linear Kalman filter. Kalman filters are generally well-known in many technical systems, e.g. for tracking dynamic processes by periodic measurements of sensor signals that (partly) reveal the actual dynamic state of the system. Using a deterministic model in addition to observing (measuring) the dynamic system, it is possible to integrate the information gathered by the periodic measurements into a prediction of the system state, even for unobserved quantities. An integral part of a Kalman filter is the tracking of the so-called covariance of the state variable, which is used to optimally use all information (new measurements and present dynamic model state) to find the true state.

However, the extended Kalman filter or non-linear Kalman filter according to the present embodiments use a nonlinear relationship between the system state or state variable(s), respectively, and the acquired sense signals which basically may be sine and cosine functions of an angle, possibly corresponding to different harmonics, of a rotating position indicator for example. The filter is then formulated in terms of a linearization of the constitutive nonlinear functions. The prediction and the correction of the state covariance is implemented by calculations which include estimates of the noise affecting the dynamic physical system and the signal measurement process.

In order to compensate for non-idealities of the physical system and to further improve the prediction accuracy of the predicted sense signals, according to other advantageous embodiments of the present disclosure, the first operation comprises a multi-order harmonic expansion as a function of the process value. Preferably, the harmonic expansion comprises at least two orders, and more preferably at least three orders.

According to further embodiments of the present disclosure, the process value is a position of a position indicator being movable relative to the sensors.

For example, the position indicator may be rotatable relative to the sensors, however, without being limited thereto, i.e. a linear movement of the position indicator relative to the sensor(s) will be likewise encompassed by other embodiments of the present disclosure.

In the example of the rotating position indicator, the position indicator may be attached to a motor/generator (drive) shaft of a motor/generator for example. The sensors may be magnetic sensors such as Hall elements for example, and the position indicator may be a magnet, e.g. a permanent magnet. Then, the sense signals generated by the sensors essentially are harmonic signals, i.e. sine or cosine functions, possibly also comprising higher order harmonics.

Yet according to further advantageous embodiments of the present disclosure, the sensor system further comprises at least one analog-to-digital converter (ADC) for quantizing at least one of the sense signals generated by the sensors and for providing the quantized sense signals as the acquired sense signals. It is to be understood that the ADC may be s single-channel ADC being capable of converting one analog signal to a digital signal at a time. Then, in subsequent prediction cycles and/or subsequent state update cycles the selected sensor/sense signal to be converted may change to constitute the desired set of the acquired sense signals as described herein (non-uniform sampling).

Also, the ADC may be a multichannel ADC providing a plurality of A/D channels. The number of A/D channels may be equal or even higher than the number of sensors provided in the sensor system according to the disclosed embodiments. In this case, all sense signals of all provided sensors may be acquired simultaneously (uniform sampling). However, the ADC may be a multichannel ADC having less than the total number of sensors provided in the sensor system. Then, a subset of the sense signals of all of the provided sensors in the sensor system may be acquired simultaneously by the ADC, wherein the subset of the acquired sense signals may vary in subsequent prediction cycles and/or subsequent state update cycles (non-uniform sampling).

According to another aspect of the various embodiments, a method for measuring a process value (e.g. position, velocity, acceleration of a position indicator) of a physical system (in particular a dynamic system comprising moving/rotating components including the position indicator for example) comprises at least the steps of:
(i) providing a plurality of sensors (e.g. hall sensors in the case of measuring a magnetic field indicating a characteristic of the physical system to be monitored) each generating a sense signal (particularly e.g. a continuous-time sense signal) as a function of the process value at a given time;
(ii) determining an actual system state of the physical system at a given state update cycle, wherein the system state comprises the process value at the given state update cycle and at least a first order derivative of the process value at the given state update cycle (i.e. in case the process value represents a position information, the first order derivative thereof represents a velocity);

(iii) determining a predicted system state of the physical system at a given prediction cycle from a previous system state at a previous state update cycle;

(iv) determining predicted sense signals at the given prediction cycle from the predicted system state by applying a first operation to the predicted system state using a sense signal model (e.g. a signal model matrix) of the physical system for predicting the sense signals;

wherein step (ii) is carried out by applying a second operation (e.g. a Kalman filter operation) to the predicted system state according to an error signal representative of the difference between a set of acquired sense signals acquired from the sense signals (i.e. sense signals provided by the sensors) each at the given prediction cycle and the corresponding predicted sense signals for each of the acquired sense signals.

It is to be noted that with regard to the effects and advantages of the features regarding the method disclosed herein, reference is made in its entirety to the corresponding, analogous features of the sensor system as well as their effects and advantages disclosed herein. Therefore, features of the sensor system disclosed herein shall be regarded also as features applicable for the definition of embodiments of the method according to this present disclosure unless explicitly stated otherwise. Likewise, features of the method disclosed herein shall be regarded also as features applicable for the definition of embodiments of the sensor system according to this present disclosure unless explicitly stated otherwise. Hence, for the purposes of conciseness of this specification and an improved understanding of the principles of the present disclosure, a duplication of explanations of these analogous features, their effects and advantages is largely omitted without any such omissions to be construed as limitations.

In essence, the method according to the present disclosure facilitates the measurement of the process value of a (highly) dynamic physical system with high accuracy and low susceptibility to non-idealities such as interference due to noise, temperature, and external fields, resulting in a significantly improved operational robustness and long-term-stability of the sensor system.

As with the sensor system, the set of the acquired sense signals used in the method according to the present disclosure may comprise one single sense signal from one of the sensors, a plurality of sense signals from more than one but less than all of the sensors, or a plurality of sense signals from all of the sensors.

According to advantageous embodiments, the set of the acquired sense signals comprises sense signals from more than one or all of the sensors, wherein each of the comprised sense signals is acquired from the respective sensors at the same given time instant, i.e. at the same prediction cycle (herein also referred to as uniform sampling).

According to other advantageous embodiments of the present disclosure, the set of the acquired sense signals comprises sense signals from more than one or all of the sensors, wherein at least two of the acquired sense signals are acquired at different given time instants, i.e. at different given prediction cycles within the same state update cycle (herein also referred to as non-uniform sampling).

Further advantageous embodiments of the present disclosure provide that selected sense signals from more than one but less than all of the sensors are selected to constitute the set of the acquired sense signals such that, among all of the sense signals, at the given prediction cycle the selected sense signals contain a more accurate information of the system state (e.g. sense signals having a phase difference or phase shift of approximately 90° at the given prediction cycle) or have at least first order derivatives with a larger absolute value (e.g. sense signals having a high rate of change at the given prediction cycle) than the non-selected sense signals (e.g. sense signals having a phase difference or phase shift of significantly less than 90°, such as −10° to 10° at the given prediction cycle for example, or sense signals having almost no rate of change at the given prediction cycle). Preferably, the selection of the selected sense signals constituting the set of the acquired sense signals is performed dynamically, i.e. instantly during the operation.

According to further advantageous embodiments of the present disclosure, the first and second operations constitute an extended Kalman filter or a non-linear Kalman filter.

Further according to other embodiments of the present disclosure, in the first operation, a multi-order harmonic expansion is used as a function of the process value. Preferably, the harmonic expansion comprises at least two orders, and more preferably at least three orders.

Yet according to other advantageous embodiments of the present disclosure, a position (e.g. an angular position) of a position indicator (e.g. a magnet) being movable (e.g. rotatable) relative to the sensors (e.g. magnetic sensors such as Hall sensors) is measured as the process value. Linear movements of the position indicator relative to the sensor(s) are likewise encompassed by other embodiments of the present disclosure.

Further advantageous embodiments are defined below.

BRIEF DESCRIPTION OF THE DRAWINGS

These and other features and advantages of the disclosed embodiments will be apparent from the following description of non-limiting embodiments of the disclosed embodiments which will be elucidated below with reference to the drawing.

In the drawing, schematically.

In the various figures, equivalent elements with respect to their function are usually provided with the same reference numerals/signs so that these elements are usually described only once.

DETAILED DESCRIPTION OF ILLUSTRATIVE EMBODIMENTS

Various embodiments will now be described by means of the Figures.

Figure 1:
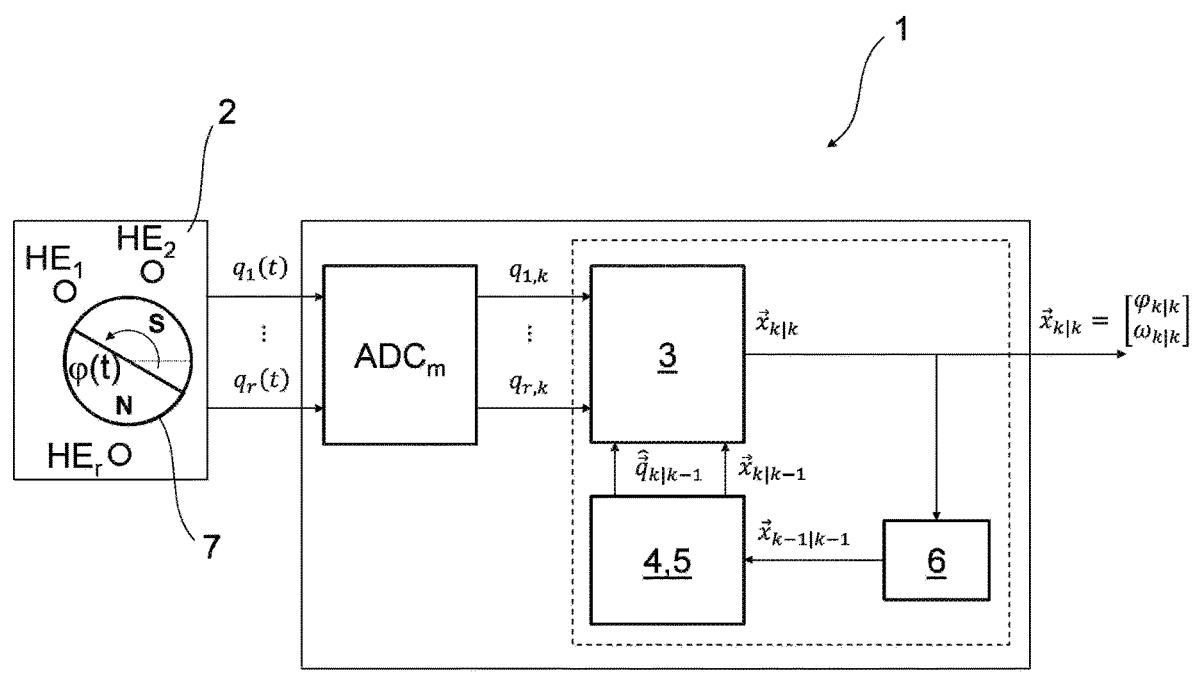
FIG. 1 shows a functional diagram of an exemplary embodiment of a sensor system for measuring a process value of a physical system according to an embodiment.

FIG. 1 shows a functional diagram of an exemplary embodiment of a sensor system 1 for measuring a process value $\varphi(t)$ of a physical system 2 according to an embodiment. As illustrated in FIG. 1, the exemplary sensor system 1 comprises a plurality of sensors $HE_i$, namely r sensors, i.e. i=1 . . . r. In the present example, the sensors $HE_i$ are magnetic sensors, such as Hall sensors for example, to sense a magnetic field. The magnetic field is generated by a position indicator 7 rotatable relative to the sensors $HE_i$ as indicated by a respective arrow in FIG. 1. Furthermore, the position indicator 7 is formed by a permanent magnet in the exemplary case having poles N(orth) and S(outh). The magnet may be connected to a drive shaft of a motor (not shown), e.g. an electric motor, however, without being limited thereto. It is to be understood that the magnetic field may be generated by other means than a permanent magnet, for example by an electric current flowing through an electromagnetic coil, a solenoid, an electric conductor and the like.

Consequently, the process value $\varphi(t)$ being measured by the sensor system 1 of FIG. 1 is an angular position of the position indicator 7 when rotating relative to the sensors $HE_i$ arranged circumferentially arranged around the position indicator 7.

Each sensor $HE_i$ is configured to generate a sense signal $q_i(t)$ as a function of the process value $\varphi(t)$ at a given time $t_k$, $t_{i,k}$.

Further regarding FIG. 1, the sensor system 1 comprises a system state corrector 3 configured to determine an actual system state $\vec{x}_{k|k}$ of the physical system 2 at a given state update cycle k. The state update cycle k corresponds to the aforementioned time instant $t_k$. As illustrated in FIG. 1, the system state $\vec{x}_{k|k}$ comprises the process value $\varphi_{k|k}$ (here a digital representation of the process value $\varphi(t)$ at the given state update cycle k and a first order derivative $\omega_{k|k}$ (also a digital representation) of the process value $\varphi(t)$ at the given state update cycle k. As the process value $\varphi(t)$ to be measured by the sensor system 1 is an angle, the first order derivative $\omega_{k|k}$ is an angular velocity of the position indicator 7. It is to be understood that still higher order derivatives may be included in the system state $\vec{x}_{k|k}$ as well, such as a second order derivative of the process value $\varphi(t)$ which would represent an angular acceleration of the position indicator 7.

Further, the sensor system 1 illustrated in FIG. 1 also comprises a system state predictor 4 configured to determine a predicted system state $\vec{x}_{k|k-1}$ of the physical system 2 at a given prediction cycle k from a previous system state $\vec{x}_{k-1|k-1}$ at a previous state update cycle k-1. As shown in the functional diagram in FIG. 1, the previous system state from a previous state update cycle k-1 is provided by a delay unit 6. In a simple implementation, this delay unit may be a memory unit (e.g. RAM, Register of μP or μC and the like) storing at least one system state $\vec{x}_{k|k}$ after being output by the state corrector 3 so that it can be used in a subsequent state update cycle as the previous system state $\vec{x}_{k-1|k-1}$.

Still further, the sensor system 1 comprises a sense signal predictor 5 configured to determine predicted sense signals $\hat{\vec{q}}_{k|k-1}$ at the given prediction cycle k from the predicted system state $\vec{x}_{k|k-1}$ by applying a first operation to the predicted system state $\vec{x}_{k|k-1}$ using a sense signal model N (cf. FIG. 2) of the physical system 2 for predicting the sense signals $\hat{\vec{q}}_{k|k-1}$. In the present case, the sense signal model N is a model matrix having as many rows as available sensors and sense signals, respectively, to predict the sense signals $\hat{\vec{q}}_{k|k-1}$ at the given prediction cycle k. In other words, the model matrix N describes the measuring process of the physical system 2. The information thereof may be obtained in an additional calibration process of the sensor system 1 which may be performed once before the first operation of the sensor system 1.

Yet further, the system state corrector 3 of the sensor system 1 in FIG. 1 is configured to determine the actual system state $\vec{x}_{k|k}$ at the given state update cycle k by applying a second operation K, in the present case a Kalman filter operation, to the predicted system state $\vec{x}_{k|k-1}$ according to an error signal $\vec{y}_{k|k-1}$ (cf. FIG. 2) representative of the difference between a set of acquired sense signals $\vec{q}_k$ acquired from the sense signals $q_i(t)$ at the given prediction cycle k and the corresponding predicted sense signals $\hat{\vec{q}}_{k|k-1}$ for each of the acquired sense signals $\vec{q}_k$.

In the presented example of the sensor system 1 in FIG. 1, the set of the acquired sense signals $\vec{q}_k$ always comprises sense signals $q_i(t)$ from all of the sensors $HE_i$, i.e. each of the acquired sense signals $\vec{q}_k$ relates to the same given time instant $t_k$ at the given prediction cycle k (uniform sampling). To this end, a multichannel analog-to-digital converter $ADC_m$ is provided in the sensor system 1. Each channel of the multichannel $ADC_m$ is connected to a respective one of the sensors $HE_i$ to facilitate simultaneous acquisition of all sense signals $q_i(t)$ at the time instant $t_k$. After the A/D conversion, the multichannel $ADC_m$ outputs the digital representations of the sense signals $q_i(t)$ as the acquired sense signals $\vec{q}_k$.

Figure 2:
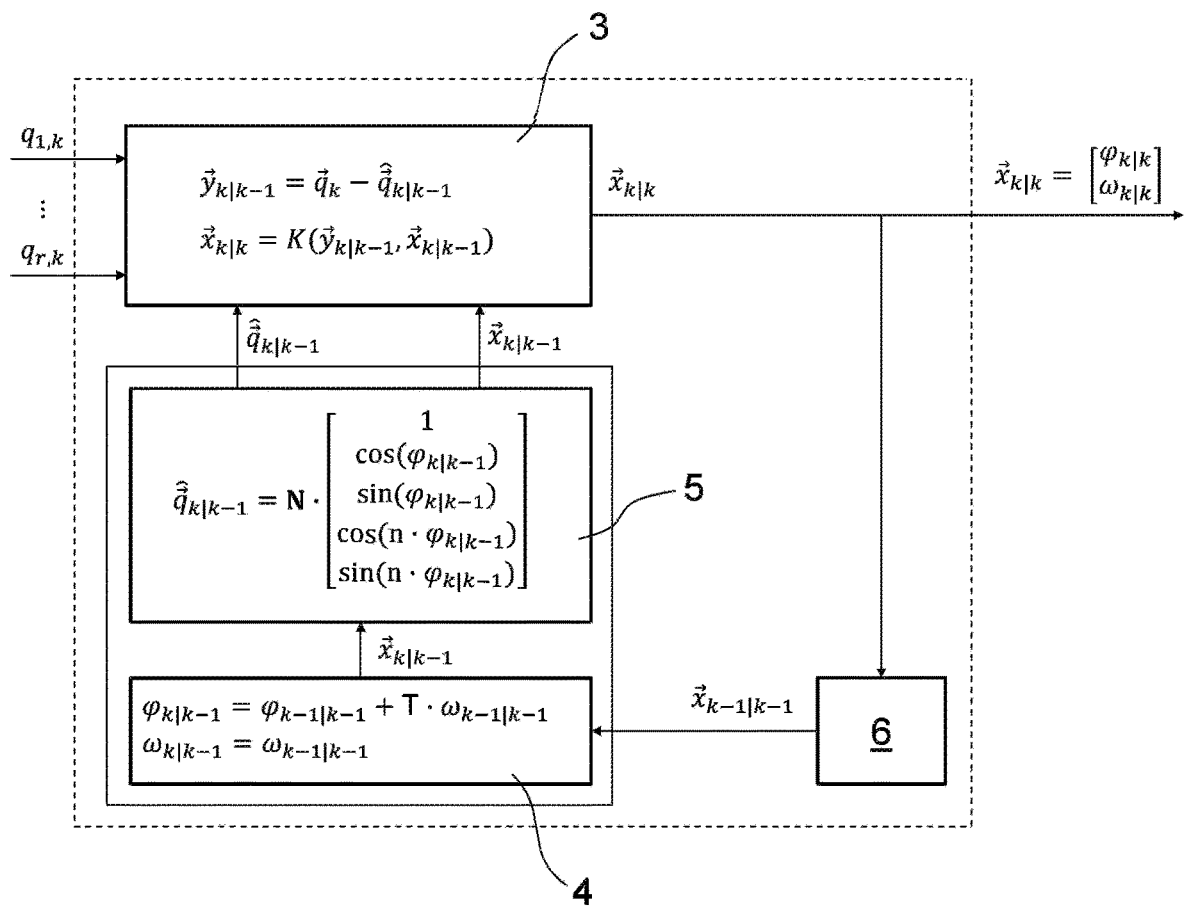
FIG. 2 illustrates a functional part of the sensor system of FIG. 1 in more detail.

FIG. 2 illustrates a functional part of the sensor system 1 of FIG. 1 in more detail. The functional part shown in detail in FIG. 2 corresponds to the dashed box in FIG. 1.

As clearly shown, the sense signal predictor 5 uses the sense signal model N which describes the measurement process of the physical system 2 to predict the predicted signals $\hat{\vec{q}}_{k|k-1}$. From information gathered at the calibration phase of the sensor system 1, the model matrix N and the characteristics n of (possibly present) higher harmonics is identified. To this end, the model matrix N may comprise row and column entries, wherein, for example, each row may relate to the sense signal of one sensor (i.e. the number of rows may equal the total number of different sensors) and the column entries of the model matrix N (i.e. the entries of each row) may refer to the components of a total number m of considered harmonics which may be assessed during the calibration process as already mentioned further above.

In general, a pair of cos (n*x), sin (n*x) is a single harmonic of order n, i.e. a full complex harmonic order as the natural space is the complex numbers. Therefore, all harmonics of order equal to 1 or greater than 1 consist of two components (i.e. sine and cosine), and a $0^{th}$ order has only one component which is the constant "1".

As shown in FIG. 2, in the illustrated exemplary embodiment of the predictor 5, two full complex harmonics of order 1 and n, respectively, are used in the prediction operation, wherein—without being mandatory—the optional $0^{th}$ harmonic (entry "1") is used in this example as well to compensate for a constant offset (e.g. a sensor offset). It is to be noted that the constant term ($0^{th}$ order), if present, is not mandatory to be considered at this specific place/operation as it may be possible to subtract a constant offset by other means as well. The total number m of the harmonics used, i.e. the specific characteristic(s)/components of each harmonic as well as the optional compensation for a constant offset, may be chosen according to specific application requirements.

This allows for an accurate and fast prediction of the predicted signals $\hat{\vec{q}}_{k|k-1}$ form the predicted system state $\vec{x}_{k|k-1}$ provided by the system state predictor 4. The system state corrector 3 may then adapt the Kalman filter operation to evaluate the corrected system state $\vec{x}_{k|k}$ from the error signal, i.e. the difference between the acquired (measured) sense signals $\vec{q}_k$ at the given prediction cycle k and the corresponding predicted signals $\hat{\vec{q}}_{k|k-1}$ at the same given prediction cycle k: $\vec{y}_{k|k-1}=\vec{q}_k-\hat{\vec{q}}_{k|k-1}$.

It is to be noted that, in the present example of the sensor system 1, each state update cycle corresponds to one single prediction cycle, therefore each of these cycles may be indexed by the same index letter k.

Furthermore, an integral part of the Kalman filtering process is the prediction and the correction of the so-called state covariance, a calculation, which includes estimates of the noise affecting the dynamic physical system and the measurement/acquisition process.

Figure 3:
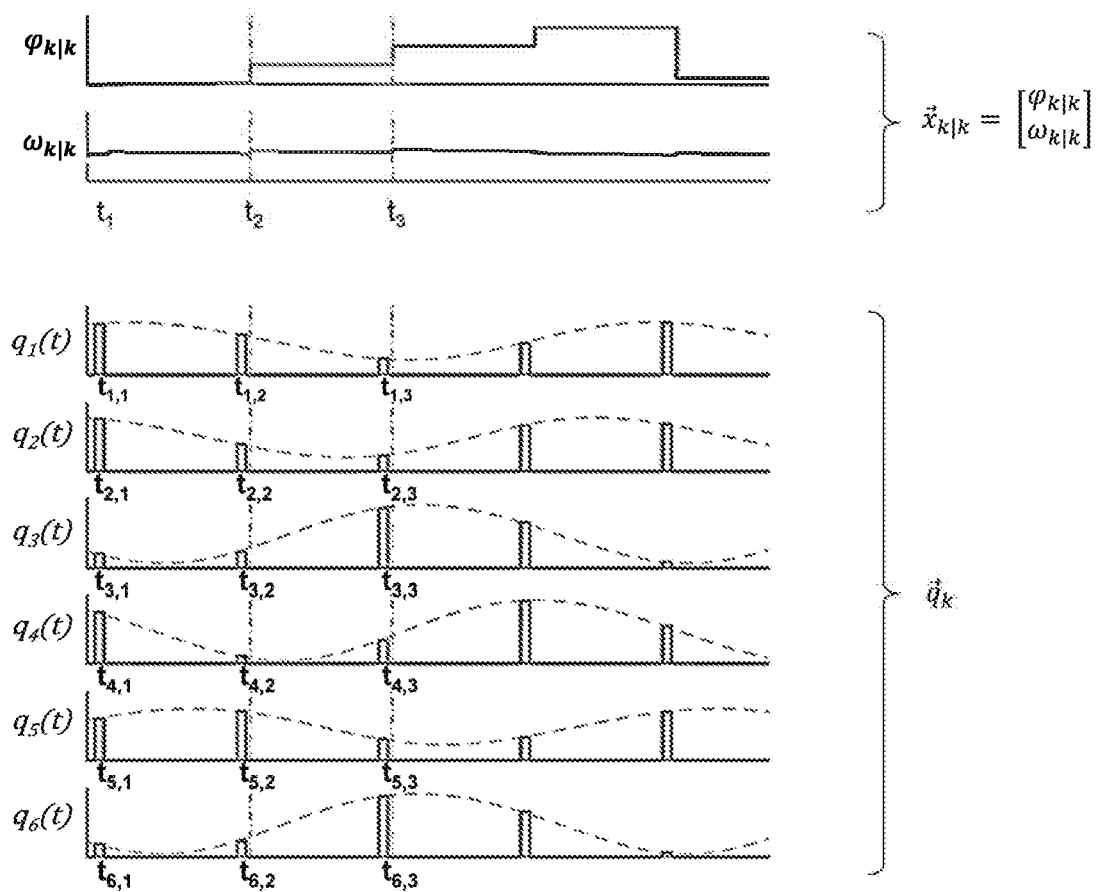
FIG. 3 shows the timely course of sense signals, acquired sense signals, and determined system states of the sensor system of FIG. 1.

FIG. 3 shows the timely course of the sense signals $q_i(t)$, corresponding acquired sense signals $\vec{q}_k$ and determined system states $\vec{x}_{k|k}$ of the sensor system 1 of FIG. 1 in the case of six (r=6) individual sensors $HE_i$ generating the sense signals $q_i(t)$.

In FIG. 3, the acquired sense signals $\vec{q}_k$, their digital representations being indicated by solid line boxes below the timely course of the respective sense signals $q_i(t)$, and the updated system states $\vec{x}_{k|k}$ are shown for three state update cycles k=1 . . . 3. In the graphs depicting the updated system states $\vec{x}_{k|k}$ the state update cycles k are represented by their corresponding times $t_1$, $t_2$, and $t_3$. In the graphs depicting the sense signals $q_i(t)$ the state update cycles k (being equivalent to the prediction cycles k in this case) for each signal channel i are represented by their corresponding times $t_{i,1}$ . . . $t_{i,3}$.

The system state vector $\vec{x}_{k|k}$ consisting of the components angle $\varphi_{k|k}$ and angular velocity $\omega_{k|k}$ is updated in each of the three denoted update cycles k at time instants $t_k$. In the illustrated operation mode "uniform sampling" of the sensor system 1 of FIG. 1, the system state $\vec{x}_{k|k}$ is updated after each complete signal acquisition and prediction cycle using the difference (error signal) $\vec{y}_{k|k-1}=\vec{q}_k-\hat{\vec{q}}_{k|k-1}$ (r-vector) between the corresponding predicted sense signals $\vec{q}_k$ and the acquired sense signals $\hat{\vec{q}}_{k|k-1}$ acquired at the same time instants $t_{1,k}=t_{2,k}=\ldots=t_{6,k}$. As examples, the system state graph indicates the state update cycles k=2 and k=3 by dash-dotted vertical lines at the time instants $t_2$, $t_3$ after completion of a full sense signal acquisition cycle.

Figure 4:
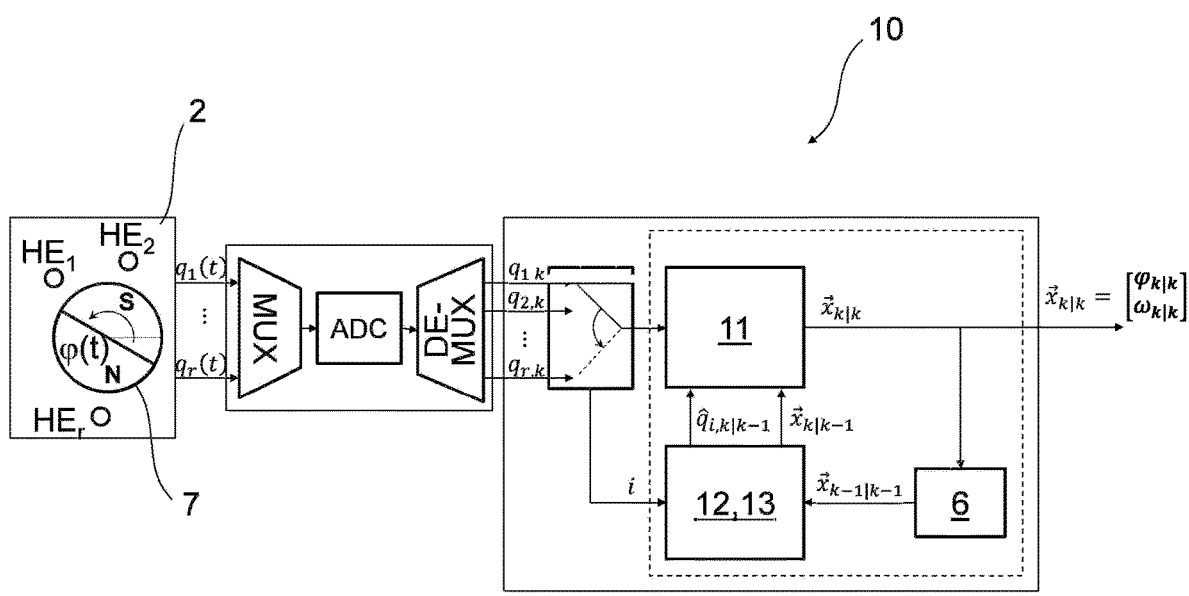
FIG. 4 shows a functional diagram of another exemplary embodiment of a sensor system for measuring a process value of a physical system according to an embodiment.

FIG. 4 shows a functional diagram of another exemplary embodiment of a sensor system 10 for measuring a process value $\varphi(t)$ of a physical system, e.g. the physical system 2 of FIG. 1, according to an embodiment.

Essentially, the sensor system 10 of FIG. 4 differs from the sensor system 1 shown in FIG. 1 in the following features:

Non-uniform sampling: The r channels for the sense signals $q_i(t)$ are now multiplexed and discretized in a single-channel ADC to sequentially obtain the signals $q_{i,k}$, i=1, . . . , r Each of these r different sense signals $q_i(t)$ is used in turn in a related prediction and correction step sequence as before in the case of the uniform sampling approach.

In the case of the sensor system 10, the sampling period may be chosen by a factor 1/r smaller, i.e. T→T/r. In this way the same overall signal rate r/T is maintained as before in the case of the uniform sampling approach used with the sensor system 1 of FIG. 1.

Figure 5:
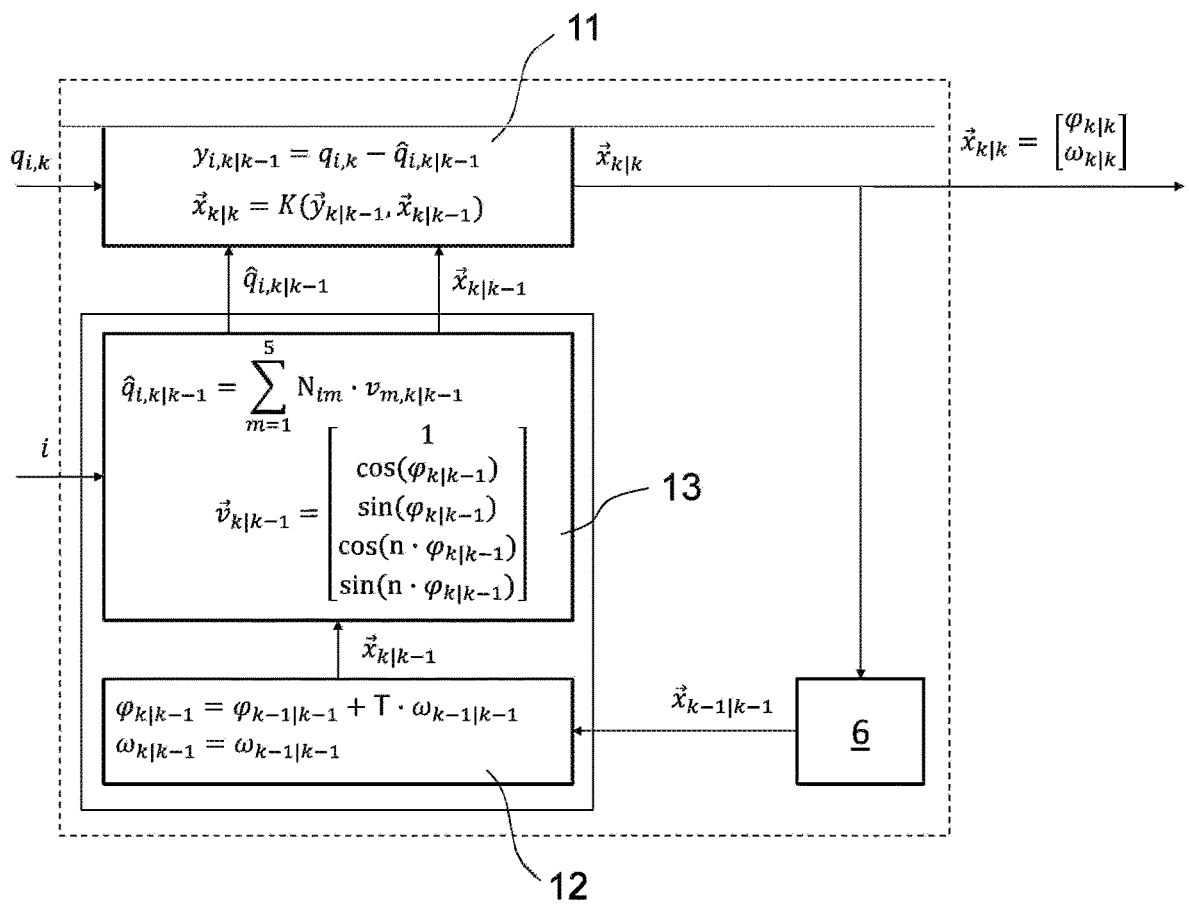
FIG. 5 illustrates a functional part of the sensor system of FIG. 4 in more detail.

FIG. 5 illustrates a functional part of the sensor system 10 of FIG. 4 in more detail. The functional part shown in detail in FIG. 5 corresponds to the dashed box in FIG. 4.

During the i-th part-cycle {i,k} of the illustrated non-uniform sampling case, only the appropriate i-th row of the model matrix $N_{ij}$, wherein j=1, . . . , 2m or j=1, . . . , 2m+1 depending on the presence of the constant component (e.g. sensor offset), is used to predict the corresponding i-th signal value $\hat{q}_{i,k|k-1}$. Nonetheless, the prediction depends on all previous state information as before, i.e. considering the components/characteristics of the total number m of the harmonics used which have been assessed during the calibration process for example.

As already mentioned herein, a pair of cos (n*x), sin (n*x) is a single harmonic of order n, i.e. a full complex harmonic order as the natural space is the complex numbers. Therefore, all harmonics of order equal to 1 or greater than 1 consist of two components (i.e. sine and cosine), and a $0^{th}$ order has only one component which is the constant "1".

In the example depicted in FIG. 5, two full complex harmonics of order 1 and n, respectively, are used in the prediction operation, wherein—without any limitation thereto—the optional $0^{th}$ harmonic (entry "1") is used in this example as well to compensate for a constant offset (e.g. sensor offset). As mentioned above, the constant term is not mandatory to be considered at this specific place/operation as it may be possible to subtract a constant offset by other means as well. The total number m of the harmonics used, i.e. the specific characteristic(s)/components of each harmonic as well as the optional compensation for a constant offset, may be chosen according to specific application requirements.

The Kalman filter operations provide update formulas for the corrected state $\vec{x}_{k|k}$ depending on the scalar difference $y_{i,k|k-1}=q_{i,k}-\hat{q}_{i,k|k-1}$ of the predicted and acquired sense signals for the i-th channel.

As in the case of the sensor system 1 of FIG. 1, the system state evaluations are adjoined by the corresponding state-covariance predictions and corrections (not shown in the figure).

Figure 6:
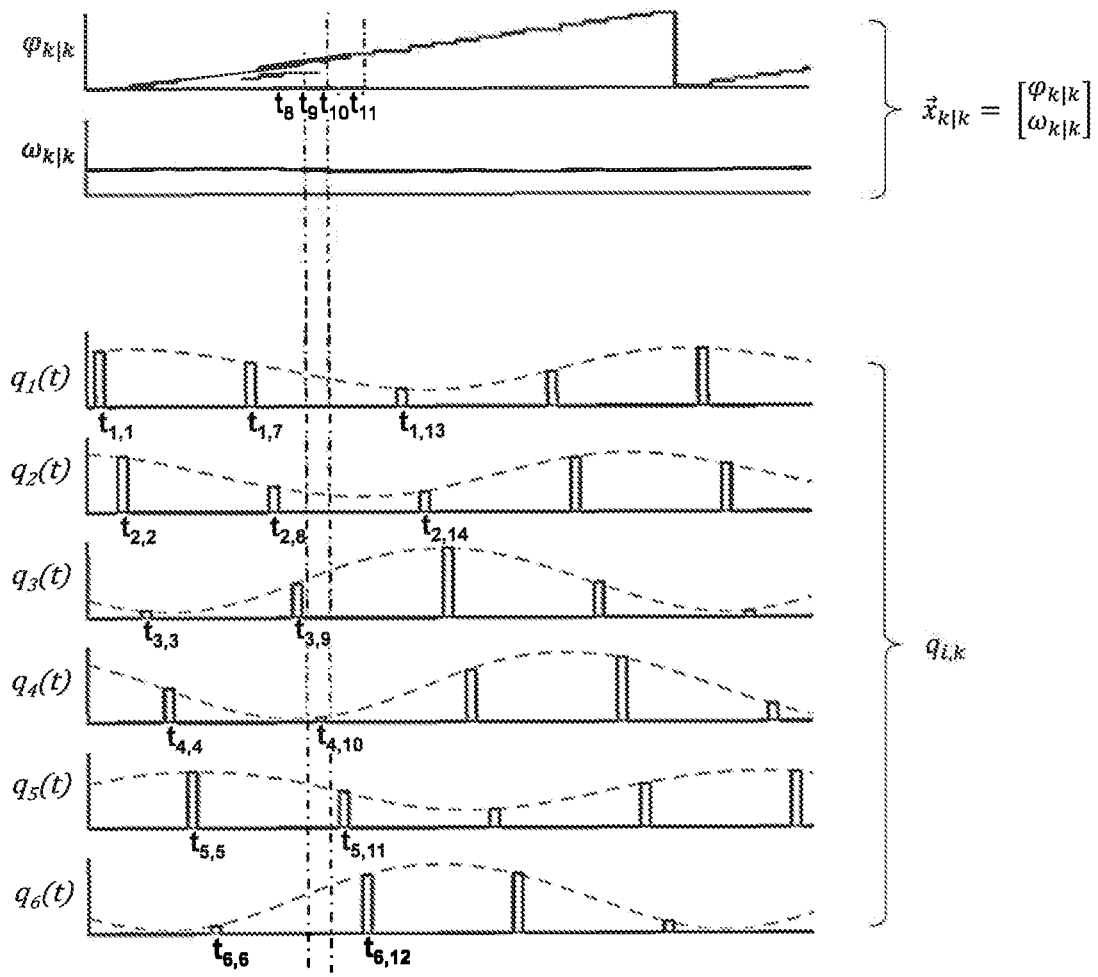
FIG. 6 shows the timely course of sense signals, acquired sense signals, and determined system states of the sensor system of FIG. 4 according to an exemplary first operational mode.

FIG. 6 shows the timely course of the sense signals $q_i(t)$, acquired sense signals $q_{i,k}$ and determined system states of the sensor system 10 of FIG. 4 according to an exemplary first operational mode, i.e. operational mode "non-uniform sampling with single sense signal update".

As shown in FIG. 6, the two upper graphs illustrating the system state $\vec{x}_{k|k}$ show the state vector consisting of the components angle $\varphi_{k|k}$ and angular velocity $\omega_{k|k}$ which are updated in state update cycles k at time instants $t_k$.

In the illustrated first operational mode, the system state $\vec{x}_{k|k}$ is updated at $t_k$ after each new sense signal acquisition process using the scalar difference $y_{i,k|k-1} = q_{i,k} - \hat{q}_{i,k|k-1}$ between predicted and acquired (measured) sense signals at time $t_{i,k}$ for the i-th sensor channel. As examples, the graphs indicate the system state update cycles k=9 and k=10 by dash-dotted vertical lines at time instants $t_9$, $t_{10}$ after measuring the sensor channels i=3 and i=4, respectively.

Figure 7:
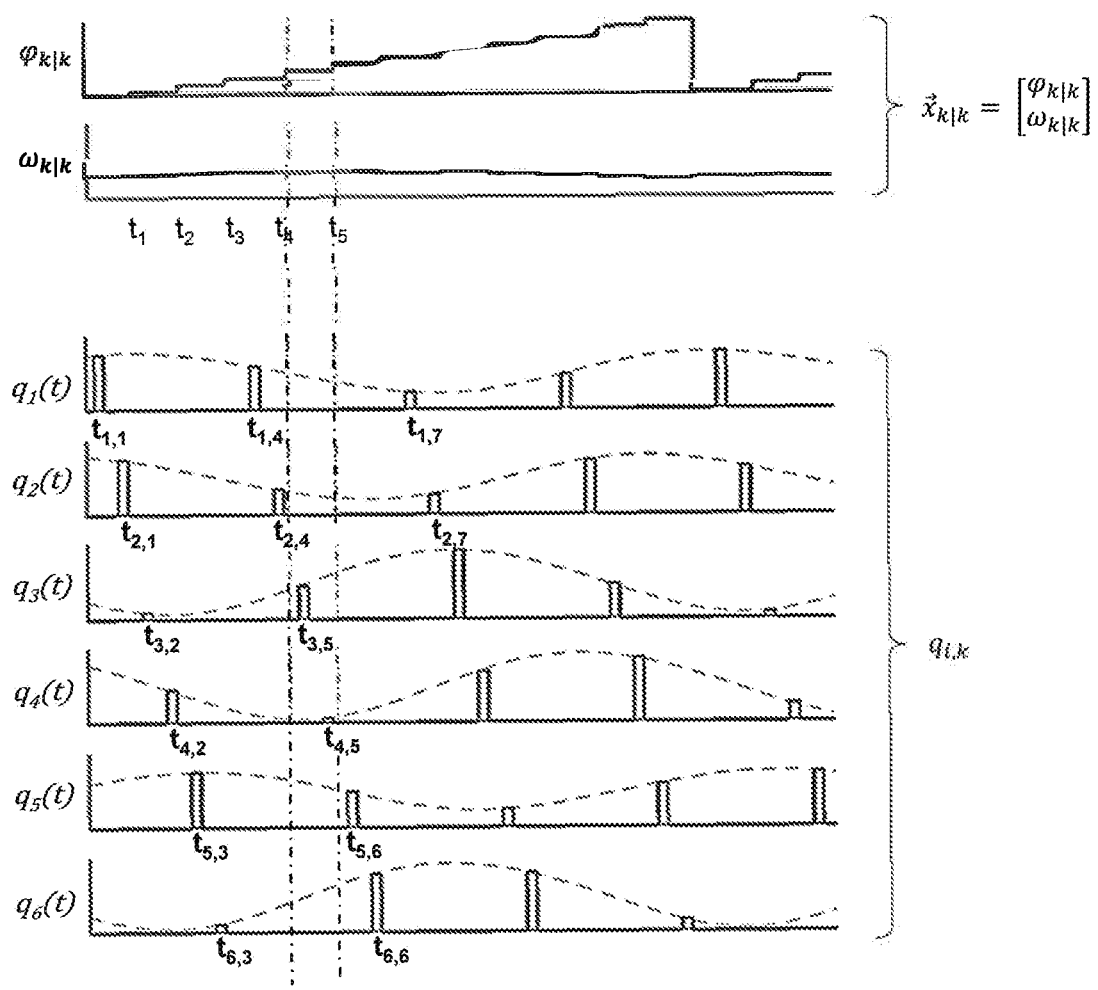
FIG. 7 shows the timely course of sense signals, acquired sense signals, and determined system states of the sensor system of FIG. 4 according to an exemplary second operational mode.

FIG. 7 shows the timely course of the sense signals $q_i(t)$, acquired sense signals $q_{i,k}$ and determined system states $\vec{x}_{k|k}$ of the sensor system 10 of FIG. 4 according to an exemplary second operational mode, i.e. operational mode "non-uniform sampling multi-signal update".

In FIG. 7, the two upper graphs illustrating the system state $\vec{x}_{k|k}$ show the state vector consisting of the components angle $\varphi_{k|k}$ and angular velocity $\omega_{k|k}$ which are updated in state update cycles k at time instants $t_k$.

In the illustrated second operational mode, the system state $\vec{x}_{k|k}$ is updated each time after a group/set of sense signals $q_{i,k}$ is acquired. In the example, the groups consist of two sensors each, measured at time instants $t_{i,k}$, $t_{i+1,k}$. Then, the difference $$\begin{pmatrix} y_{i,k|k-1} \\ y_{i+1,k|k-1} \end{pmatrix} = \begin{pmatrix} q_{i,k} \\ q_{i+1,k} \end{pmatrix} - \begin{pmatrix} \hat{q}_{i,k|k-1} \\ \hat{q}_{i+1,k|k-1} \end{pmatrix}$$

is used for the state update calculation, i.e. (only) the difference between predicted and measured sensor signal channels i and i+1. As examples, the graphs indicate the state update cycles k=4 and k=5 at instants $t_4$, $t_5$ by dash-dotted vertical lines after measuring the sensor channels i=1,2 and i=3,4, respectively.

Figure 8:
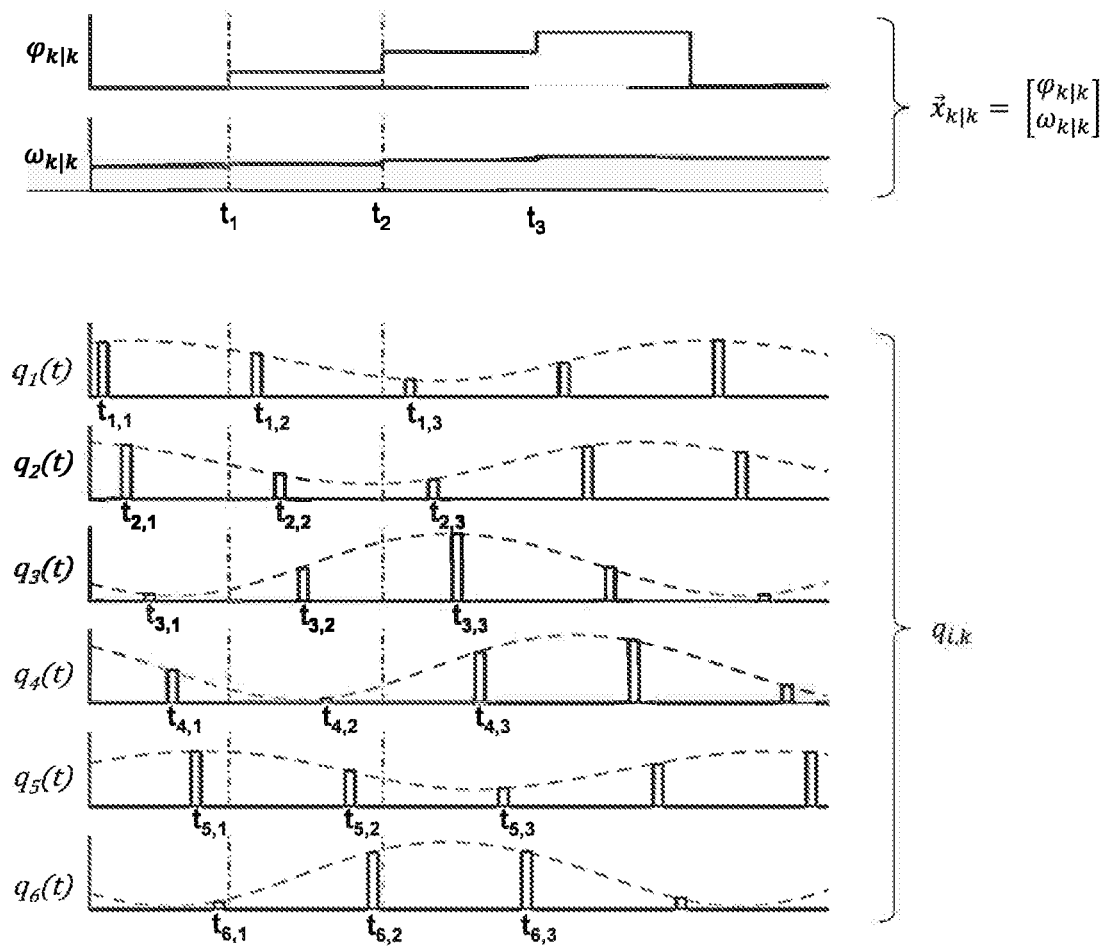
FIG. 8 shows the timely course of sense signals, acquired sense signals, and determined system states of the sensor system of FIG. 4 according to an exemplary third operational mode.

FIG. 8 shows the timely course of the sense signals $q_i(t)$, acquired sense signals $q_{i,k}$ and determined system states $\vec{x}_{k|k}$ of the sensor system 10 of FIG. 4 according to an exemplary third operational mode, i.e. operational mode "non-uniform sampling with full signal update".

Again in FIG. 8, the upper two graphs illustrating the system state $\vec{x}_{k|k}$ show the state vector consisting of the components phase $\varphi_{k|k}$ and angular velocity $\omega_{k|k}$ in state update cycle k at time instant $t_k$.

In the illustrated third operational mode, the system state $\vec{x}_{k|k}$ is updated after each complete sense signal acquisition cycle using the difference $\vec{y}_{k|k-1} = \vec{q}_k - \hat{\vec{q}}_{k|k-1}$ (r-vector) between the corresponding predicted and measured/acquired sense signals at time instants $t_{1,k}, \ldots, t_{6,k}$. As examples, the graphs indicate the state update cycles k=1 and k=2 at time instants $t_1$, $t_2$ by dash-dotted vertical lines after measuring the last sensor channel i=6 at $t_{6,1}$ and $t_{6,2}$, respectively.

Figure 9:
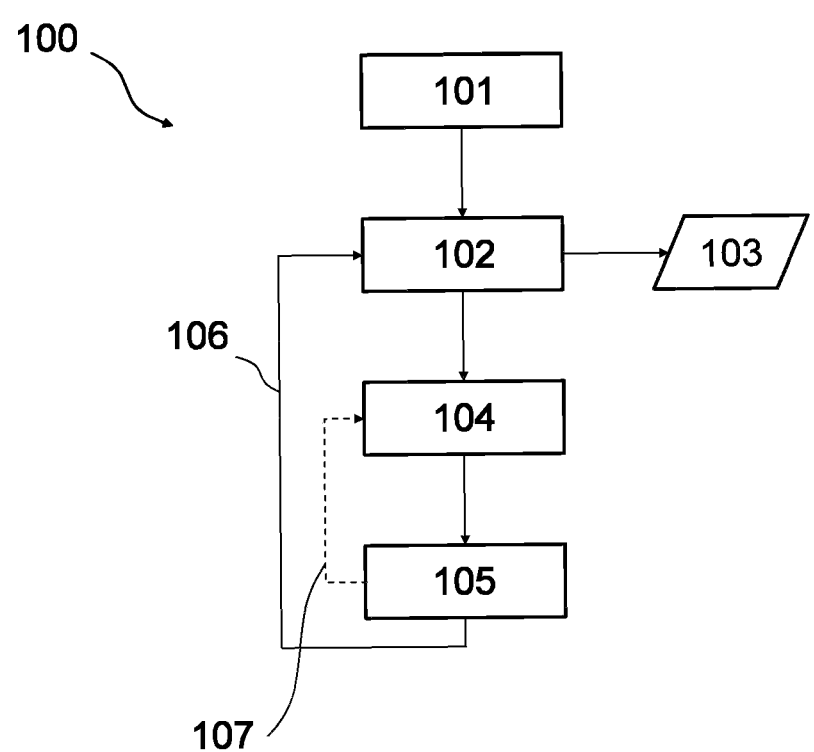
FIG. 9 shows a flowchart of an exemplary embodiment of method for measuring a process value of a physical system according to an embodiment.

FIG. 9 shows a flowchart of an exemplary embodiment of method 100 for measuring a process value $\varphi(t)$ of a physical system, such as the physical system 2 in FIG. 1, according to embodiment employed in the sensor system 1 of FIG. 1.

As illustrated, the method 100 comprises the steps:
Step 101:
Providing a plurality of sensors $HE_i$ each generating a sense signal $q_i(t)$ as a function of the process value $\varphi(t)$ at a given time $t_k$.
Step 101:
Determining an actual system state $\vec{x}_{k|k}$ of the physical system 2 at a given state update cycle k, wherein the system state $\vec{x}_{k|k}$ comprises the process value $\varphi_{k|k}$ at the given state update cycle k and at least a first order derivative $\omega_{k|k}$ of the process value $\varphi(t)$ at the given state update cycle k.
Step 103: Outputting the determined system state $\vec{x}_{k|k}$.
Step 104:
Determining a predicted system state $\vec{x}_{k|k-1}$ of the physical system 2 at a given prediction cycle k,{i,k} from a previous system state $\vec{x}_{k-1|k-1}$ at a previous state update cycle k−1.
Step 105:
Determining predicted sense signals $\hat{\vec{q}}_{k|k-1}$, $\hat{q}_{i,k|k-1}$ at the given prediction cycle k,{i,k} from the predicted system state $\vec{x}_{k|k-1}$ by applying a first operation to the predicted system state $\vec{x}_{k|k-1}$ using a sense signal model N of the physical system 2 for predicting the sense signals $\hat{\vec{q}}_{k|k-1}$, $\hat{q}_{i,k|k-1}$.

Further in the method 100 illustrated in FIG. 9, step 101 is carried out by applying a second operation K to the predicted system state $\vec{x}_{k|k-1}$ according to an error signal $\vec{y}_{k|k-1}$, $y_{i,k|k-1}$ representative of the difference between a set of acquired sense signals $\vec{q}_k$, $q_{i,k}$ acquired from the sense signals $q_i(t)$ each at the given prediction cycle k,{i,k} and the corresponding predicted sense signals $\hat{\vec{q}}_{k|k-1}$, $\hat{q}_{i,k|k-1}$ for each of the acquired sense signals $\vec{q}_k$, $q_{i,k}$.

If method 100 will be employed for operating the sensor system 1 of FIG. 1, the method 100 will only perform an outer loop 106 because for each state update cycle k there is only one prediction cycle k, i.e. acquisition and prediction of all sense signals in steps 101 and 105 is always performed simultaneously, i.e. at the same single time instant $t_k$.

On the other hand, if method 100 will be employed for operating the sensor system 10 of FIG. 4, in the second and third operational modes of sensor system 10 shown in FIGS. 7 and 8, the method 100 will also perform an inner loop 107 in which a plurality of sense signals $q_{i,k}$ is acquired and a plurality of correspondingly sense signals $\hat{q}_{i,k|k-1}$ is predicted each at different prediction cycles {i,k} corresponding to different time instants $t_{i,k}$.

It is to be noted that, in order to further improve the accuracy of the prediction of the predicted system state, the system state predictor may additionally use a second order derivative of the process value of the last system state $\vec{x}_{k-1|k-1}$, i.e. also an angular acceleration $\alpha$ in addition to the angular velocity $\omega$ and the angle $\varphi$ shown in the system state predictors 4 and 12 in FIGS. 2 and 5, respectively.

Moreover, another route of possible further improvements addresses the sense signal model N. In the sensor systems 1 and 10 shown in FIGS. 2 and 5, respectively, the prediction of the sense signals $\hat{\vec{q}}_{k|k-1}$, $\hat{q}_{i,k|k-1}$ only depends on the angle $\varphi_{k|k-1}$ but not on the angular velocity $\omega_{k|k-1}$. However, real hardware cannot measure instantaneously and is therefore also affected by the predicted rotational speed $\omega_{k|k-1}$. Also modelling this dependency (e.g. using an integral of the state components over the measurement time interval), will have the beneficial effects that longer measurement times will reduce the signal noise in the acquired sense signals $\vec{q}_k$, $q_{i,k}$, and that the improved model for predicting the sense signals $\hat{\vec{q}}_{k|k-1}$, $\hat{q}_{i,k|k-1} = f(\varphi_{k|k-1}, \omega_{k|k-1}, T/r)$ allows for an even more accurate system state correction.

While the various embodiments have been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure, and the appended claims. In the claims, the word "comprising" does not exclude other elements or steps, and the indefinite article "a" or "an" does not exclude a plurality of elements or steps. The mere fact that certain measures are recited in different dependent claims does not indicate that a combination of these measures cannot be used to advantage.

Any reference signs in the claims should not be construed as limiting the scope thereof.

What is claimed is:

1. A sensor system for measuring a process value of a physical system, comprising:
   a plurality of sensors, wherein each sensor is configured to generate a sense signal as a function of the process value at a given time;
   a system state corrector configured to determine an actual system state of the physical system at a given state update cycle, wherein the system state comprises the process value at the given state update cycle and at least a first order derivative of the process value at the given state update cycle;
   a system state predictor configured to determine a predicted system state of the physical system at a given prediction cycle from a previous system state at a previous state update cycle; and
   a sense signal predictor configured to determine predicted sense signals at the given prediction cycle from the predicted system state by applying a first operation to the predicted system state using a sense signal model of the physical system for predicting the sense signals;
   wherein the system state corrector is configured to determine the actual system state at the given state update cycle by applying a second operation to the predicted system state according to an error signal representative of the difference between a set of acquired sense signals acquired from the sense signals each at the given prediction cycle and the corresponding predicted sense signals for each of the acquired sense signals;
   wherein the first operation comprises a multi-order harmonic expansion as a function of the process value; and
   wherein the actual system state at each given state update cycle is supplied in real-time as an output of the sensor system.

2. The sensor system as claimed in claim 1, wherein the set of the acquired sense signals comprises one sense signal from one of the sensors, or a plurality of sense signals from more than one but less than all of the sensors such that the set of the acquired sense signals contains only a partial information of the system state, wherein the partial information is not sufficient to deterministically identify the system state at the state update cycle.

3. The sensor system as claimed in claim 1, wherein the set of the acquired sense signals comprises sense signals from more than one or all of the sensors, wherein each of the acquired sense signals corresponds to the same given time.

4. The sensor system as claimed in claim 1, wherein the set of the acquired sense signals comprises sense signals from more than one or all of the sensors, wherein at least two of the acquired sense signals correspond to different given times.

5. The sensor system as claimed in claim 1, wherein the set of the acquired sense signals comprises selected sense signals from more than one but less than all of the sensors, wherein, among all of the sense signals, at the prediction cycle the selected sense signals contain or have at least first order derivatives with a larger absolute value than the non-selected sense signals.

6. The sensor system as claimed in claim 1, wherein the sense signal predictor is configured to determine only the predicted sense signals corresponding to the set of acquired sense signals at the given prediction cycle.

7. The sensor system as claimed in claim 1, wherein the first and second operations constitute an extended Kalman filter or a non-linear Kalman filter.

8. A sensor system for measuring a process value of a physical system, comprising:
   a plurality of sensors, wherein each sensor is configured to generate a sense signal as a function of the process value at a given time;
   a system state corrector configured to determine an actual system state of the physical system at a given state update cycle, wherein the system state comprises the process value at the given state update cycle and at least a first order derivative of the process value at the given state update cycle;
   a sense signal predictor configured to determine predicted sense signals at the given prediction cycle from a predicted system state of the physical system at a given prediction cycle, the predicted system state being determined from a previous system state at a previous state update cycle, by applying a first operation to the predicted system state using a sense signal model of the physical system for predicting the sense signals;
   wherein the system state corrector is configured to determine the actual system state at the given state update cycle by applying a second operation to the predicted system state according to an error signal representative of the difference between a set of acquired sense signals acquired from the sense signals each at the given prediction cycle and the corresponding predicted sense signals for each of the acquired sense signals;
   wherein the first operation comprises a multi-order harmonic expansion as a function of the process value; and
   wherein the actual system state at each given state update cycle is supplied in real-time as an output of the sensor system.

9. The sensor system as claimed in claim 1, wherein the process value is a position of a position indicator being movable relative to the sensors.

10. The sensor system as claimed in claim 1, further comprising at least one analog-to-digital converter for quantizing at least one of the sense signals generated by the sensors and for providing the quantized sense signals as the acquired sense signals.

11. A computer-based method for measuring a process value of a physical system, comprising the steps of:
  (i) generating a sense signal by each of a plurality of sensors as a function of the process value at a given time;
  (ii) determining an actual system state of the physical system at a given state update cycle, wherein the system state comprises the process value at the given state update cycle and at least a first order derivative of the process value at the given state update cycle;
  (iii) determining a predicted system state of the physical system at a given prediction cycle from a previous system state at a previous state update cycle; and
  (iv) determining predicted sense signals at the given prediction cycle from the predicted system state by applying a first operation to the predicted system state using a sense signal model of the physical system for predicting the sense signals;
  wherein determining an actual system state is carried out by applying a second operation to the predicted system state according to an error signal representative of the difference between a set of acquired sense signals acquired from the sense signals each at the given prediction cycle and the corresponding predicted sense signals for each of the acquired sense signals;
  wherein the first operation comprises a multi-order harmonic expansion as a function of the process value; and
  wherein the actual system state at each given state update cycle is supplied in real-time as an output of the sensor system.

12. The method as claimed in claim 11, wherein the set of the acquired sense signals comprises sense signals from more than one or all of the sensors, wherein each of the comprised sense signals is acquired from the respective sensors at the same given time.

13. The method as claimed in claim 11, wherein the set of the acquired sense signals comprises sense signals from more than one or all of the sensors, wherein at least two of the acquired sense signals is acquired at different given times.

14. The method as claimed in claim 11, wherein selected sense signals from more than one but less than all of the sensors are selected to constitute the set of the acquired sense signals such that, among all of the sense signals, at the prediction cycle the selected sense signals contain a more accurate information of the system state or have at least first order derivatives with a larger absolute value than the non-selected sense signals.

15. The method as claimed in claim 11, wherein an extended Kalman filter or a non-linear Kalman filter is constituted by the first and second operations.

16. A computer-based method for measuring a process value of a physical system, comprising the steps of:
  (i) generating a sense signal by each of a plurality of sensors as a function of the process value at a given time;
  (ii) determining an actual system state of the physical system at a given state update cycle, wherein the system state comprises the process value at the given state update cycle and at least a first order derivative of the process value at the given state update cycle; and
  (iii) determining predicted sense signals at the given prediction cycle from a predicted system state of the physical system at a given prediction cycle, the predicted system state being determined from a previous system state at a previous state update cycle, by applying a first operation to the predicted system state using a sense signal model of the physical system for predicting the sense signals;
  wherein determining an actual system state is carried out by applying a second operation to the predicted system state according to an error signal representative of the difference between a set of acquired sense signals acquired from the sense signals each at the given prediction cycle and the corresponding predicted sense signals for each of the acquired sense signals;
  wherein, in the first operation, a multi-order harmonic expansion is used as a function of the process value; and
  wherein the actual system state at each given state update cycle is supplied in real-time as an output of the sensor system.

17. The method as claimed in claim 11, wherein a position of a position indicator being movable relative to the sensors is measured as the process value.

* * * * *